US012671282B2

(12) United States Patent　　　(10) Patent No.:　US 12,671,282 B2
Fatemi et al.　　　　　　　　　　 (45) Date of Patent:　　Jun. 30, 2026

(54) ROTARY ELECTRIC MACHINE WITH ROTOR INCLUDING LOW-COERCIVITY AND HIGH-COERCIVITY MAGNETS

(71) Applicant: GM GLOBAL TECHNOLOGY OPERATIONS LLC, Detroit, MI (US)

(72) Inventors: Alireza Fatemi, Canton, MI (US); Thomas W. Nehl, Shelby Township, MI (US); Derek F. Lahr, Howell, MI (US); Xiaofeng Yang, Troy, MI (US); Anthony M. Coppola, Rochester Hills, MI (US); Peng Peng, Columbus, OH (US)

(73) Assignee: GM Global Technology Operations LLC, Detroit, MI (US)

( * ) Notice: Subject to any disclaimer, the term of this patent is extended or adjusted under 35 U.S.C. 154(b) by 226 days.

(21) Appl. No.: 18/519,253

(22) Filed: Nov. 27, 2023

(65) Prior Publication Data

US 2025/0175043 A1　　　May 29, 2025

(51) Int. Cl.
| | |
|---|---|
| *H02K 1/27* | (2022.01) |
| *H02K 1/02* | (2006.01) |
| *H02K 1/276* | (2022.01) |
| *H02K 1/28* | (2006.01) |
| *H02K 1/32* | (2006.01) |
| *H02K 7/00* | (2006.01) |

(52) U.S. Cl.
CPC .............. *H02K 1/2766* (2013.01); *H02K 1/02* (2013.01); *H02K 1/28* (2013.01); *H02K 1/32* (2013.01); *H02K 7/006* (2013.01)

(58) Field of Classification Search
CPC .......... H02K 1/2766; H02K 1/02; H02K 1/28; H02K 1/32; H02K 7/006; H02K 2213/03; H02K 1/2773; H02K 21/028; H02K 21/14; B60K 1/00; B60L 15/20; B60L 50/60
See application file for complete search history.

(56) References Cited

U.S. PATENT DOCUMENTS

2011/0304235 A1　12/2011　Hashiba et al.
2013/0320796 A1 *　12/2013　Vyas ................... H02K 1/2766
　　　　　　　　　　　　　　　　　　　　　310/156.43
(Continued)

FOREIGN PATENT DOCUMENTS

DE　　102014102411 A1　9/2014
DE　　112018003942 T5　5/2020

*Primary Examiner* — Thomas Truong
(74) *Attorney, Agent, or Firm* — Quinn IP Law

(57)　　　　　　　　ABSTRACT

A rotor for a rotary electric machine incudes an annular stack of rotor lamination layers ("rotor lams") constructed of a magnetic core material. The rotor lams include inner axial surfaces collectively defining a first plurality of openings through the magnetic core material, a second plurality of openings through the magnetic core material, and a third plurality of openings through the magnetic core material. Each respective one of a first plurality permanent magnets, a second plurality of permanent magnets, and a third plurality of permanent magnets, is disposed respectively within a corresponding one of the first plurality of openings, the second plurality of openings, and the third plurality of openings. The first plurality and the third plurality of permanent magnets include high-coercivity magnets. The second plurality of permanent magnets includes low-coercivity magnets.

20 Claims, 7 Drawing Sheets

(56) References Cited

U.S. PATENT DOCUMENTS

| | | | |
|---|---|---|---|
| 2015/0115758 A1* | 4/2015 | Koka ..................... | H02K 21/14 |
| | | | 318/139 |
| 2016/0181896 A1* | 6/2016 | Masubuchi .......... | H02K 1/2766 |
| | | | 29/598 |
| 2020/0021153 A1* | 1/2020 | Saito .................... | H02K 1/2766 |
| 2022/0190657 A1 | 6/2022 | Tokat et al. | |
| 2023/0198325 A1* | 6/2023 | Sanga ................. | H02K 1/2766 |
| | | | 310/156.53 |
| 2024/0113576 A1* | 4/2024 | Tanaka .................. | H02K 15/03 |

\* cited by examiner

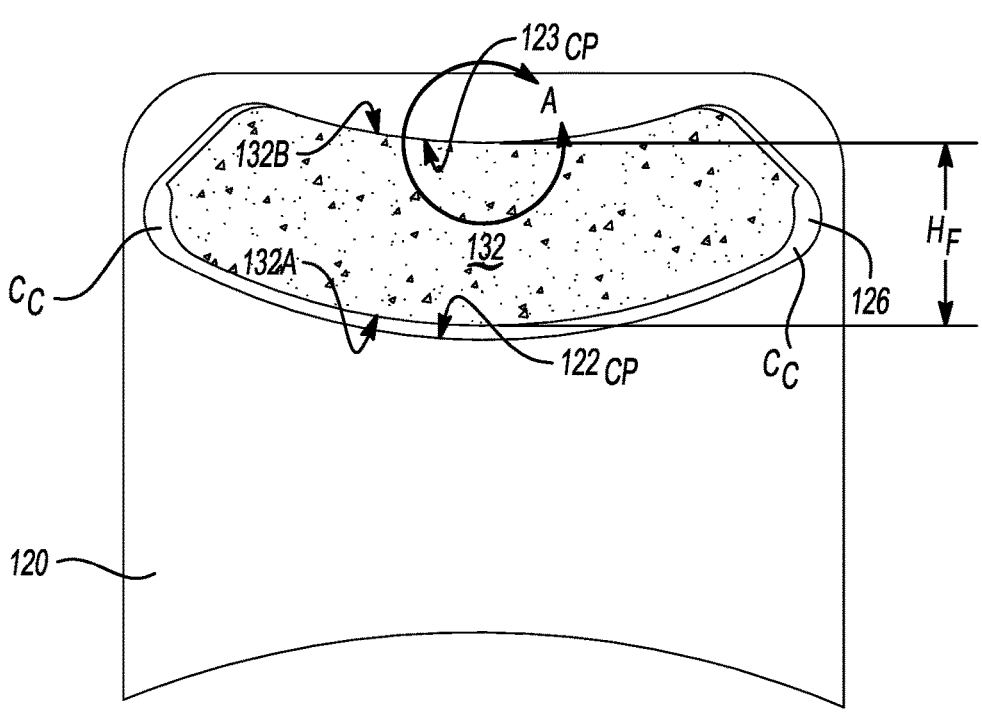
_Fig-3A_
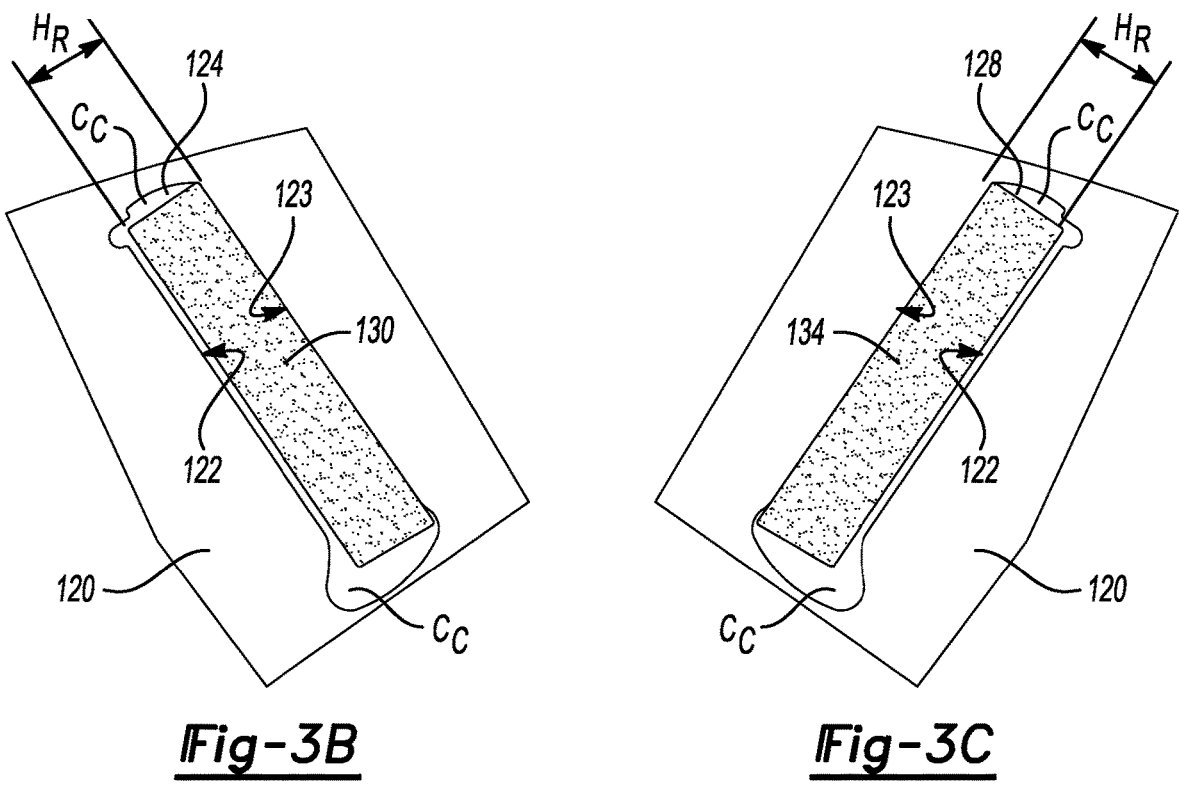
_Fig-3B_  _Fig-3C_

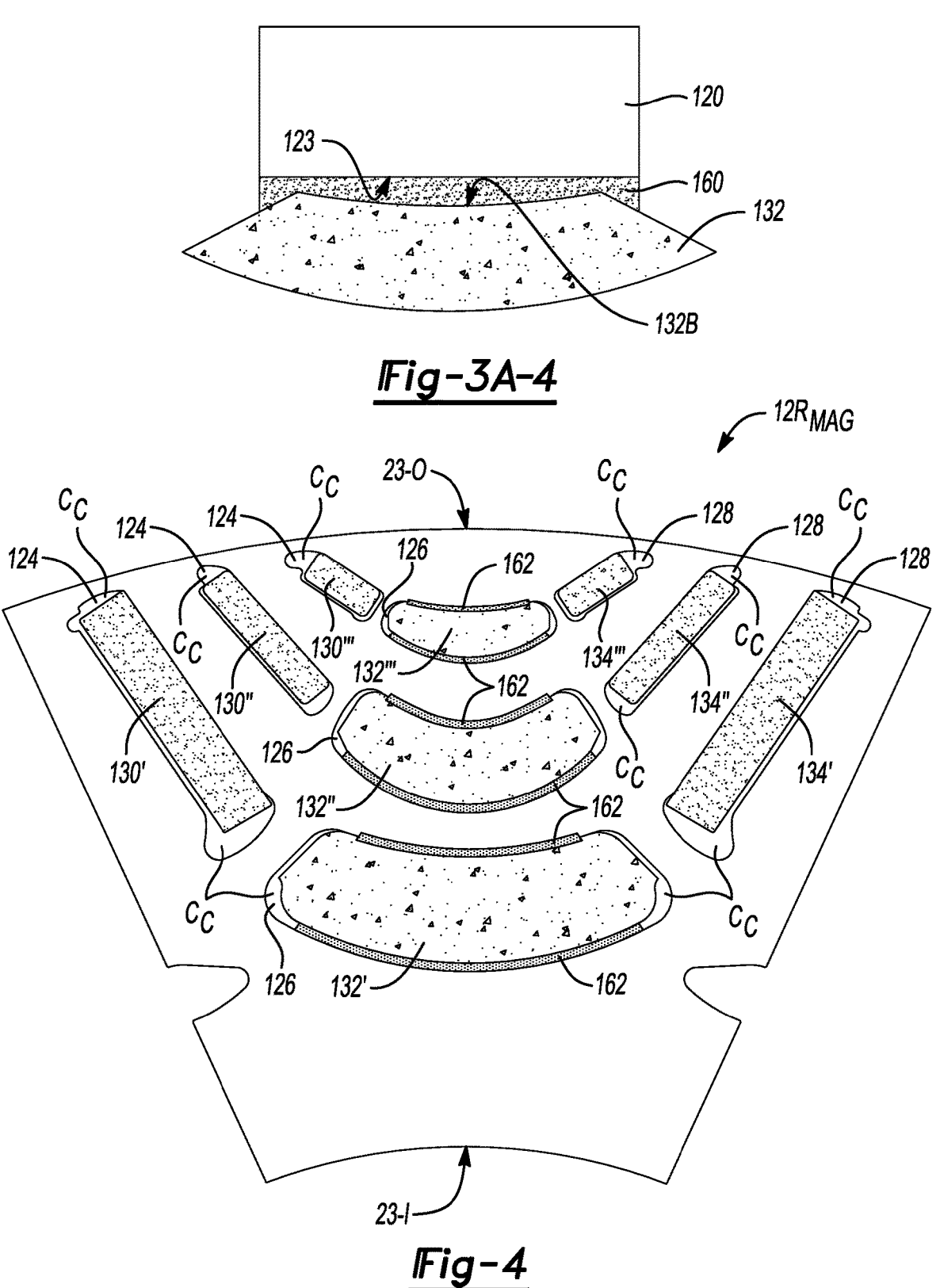
_Fig-3A-4_
_Fig-4_

ROTARY ELECTRIC MACHINE WITH ROTOR INCLUDING LOW-COERCIVITY AND HIGH-COERCIVITY MAGNETS

INTRODUCTION

A rotary electric machine of the type used in an electric drive system operates in a motoring mode in which output torque is delivered to a coupled load, e.g., one or more road wheels of a motor vehicle, and/or a generating mode in which machine rotation is used to generate electricity. In a typical configuration, the electric machine includes a cylindrical rotor formed from an annular stack of thin magnetic rotor lamination layers or "rotor lams." The magnetic material of a rotor lam is typically an alloy of iron and silicon generally referred to in the art as electrical steel.

Permanent magnets, for example but not limited to, rare-earth magnets, such as neodymium (Nd) magnets, also known as NdFeB, NIB, or Neo magnets, are disposed within openings or slots in the rotor to generate motor flux having a flux field that follows a predefined path, which can be boosted and/or opposed. Boosting the flux field increases torque production of the electric machine, while opposing the flux field will limit torque production of the electric machine. The configuration or topology of the permanent magnets disposed within the rotor determines the electric machine's power density.

Nd magnets are rare-earth magnets made from an alloy of neodymium (Nd), iron (Fe), and boron (B). Nd magnets have high-coercivity, i.e., resistance to being demagnetized, and a high magnetic energy density ($BH_{max}$). Reducing the amount of rare-earth elements used in electric machines can improve sustainability.

SUMMARY

Accordingly, disclosed herein are rotary electric machines and rotors having both high-coercivity permanent magnets and low-coercivity permanent magnets in parallel configurations within a three-level topology, with each level being a flux barrier.

The high-coercivity permanent magnets may include rare-earth magnets, for example but not limited to, neodymium (Nd) magnets and/or samarium (Sm) magnets, while the low-coercivity magnets may include, for example but not limited to ferrite, aluminum, nickel, and cobalt ("Alinco"), and/or ceramic magnets, which include less than about 10% by weight of rare-earth elements and/or less than about 1% by weight of heavy rare-earth materials, for example but not limited to, Nd, Terbium (Tb), and/or Dysprosium (Dy). The combination of high-coercivity permanent magnets and low-coercivity permanent magnets provides a reduction in usage of rare-earth elements in electric machines, improving sustainability.

Strategic placement of the three flux barriers within the rotor may enhance torque performance of the electric machine, while ensuring smooth passage of the magnetic field. Additionally, the location and distribution of the two types of permanent magnets disposed within each flux barrier may further enhance torque performance of the electric machine, while providing robustness against demagnetization and minimizing cross demagnetization.

Further, permanent magnets having a rectangular and/or a curvilinear shape are disclosed.

A rotor for a rotary electric machine may include an annular stack of rotor lamination layers ("rotor lams") constructed of a magnetic core material. Each rotor lam may have inner axial surfaces, or lamination walls, collectively defining a first plurality of openings through the magnetic core material, a second plurality of openings through the magnetic core material, and a third plurality of openings through the magnetic core material.

Each rotor may include a first plurality of permanent magnets, each respective one of which is disposed within a corresponding one of the first plurality of openings. The first plurality of permanent magnets may include high-coercivity magnets, for example but not limited to, rare-earth magnets, e.g., neodymium (Nd) magnets or samarium (Sm) magnets.

Each rotor may include a second plurality of permanent magnets, each respective one of which is disposed within a corresponding one of the second plurality of openings. The second plurality of permanent magnets may include low-coercivity magnets, for example but not limited to, ferrite magnets, and/or other magnets that include less than about 10% by weight of rare-earth elements and/or less than about 1% by weight of heavy rare-earth elements.

Each rotor may include a third plurality of permanent magnets, each respective one of which is disposed within a corresponding one of the third plurality of openings. The third plurality of permanent magnets may include high-coercivity magnets, for example but not limited to, rare-earth magnets, e.g., neodymium (Nd) magnets or samarium (Sm) magnets.

The first plurality of permanent magnets may be arranged in a first stacked configuration. Each of the first plurality of permanent magnets may have parallel magnetization.

The second plurality permanent magnets may be arranged in a second stacked configuration. Each of the second plurality of permanent magnets may have parallel magnetization.

The second plurality of permanent magnets may include curved magnets having radial magnetization.

According to one aspect of the disclosure, at least one of the second plurality of openings includes a double hump profile.

According to one aspect of the disclosure, at least one of the curved magnets may include a polymer support layer between the at least one of the curved magnets and the corresponding one of the second plurality of openings.

According to one aspect of the disclosure, each of the second plurality of permanent magnets may be bonded to the annular stack of rotor lams.

The third plurality of permanent magnets may be arranged in a third stacked configuration. Each of the third plurality of permanent magnets may have parallel magnetization.

According to one aspect of the disclosure, each of the first plurality of permanent magnets and each of the third plurality of permanent magnets may have a rectangular configuration.

According to one aspect of the disclosure, the first plurality of permanent magnets and the third plurality of permanent magnets may include rare-earth magnets. The second plurality of permanent magnets may include ferrite magnets, and/or other magnets that include less than about 10% by weight of rare-earth elements and/or less than about 1% by weight of heavy rare-earth elements.

A height of at least one of the ferrite magnets may be greater than a height of at least one of the rare-earth magnets.

According to one aspect of the disclosure, at least some of the first plurality of openings, the plurality of second openings, and the plurality of third openings may define one or more cooling channels therethrough in proximity to at least some of the first plurality of permanent magnets, the second plurality of permanent magnets, and the third plurality of permanent magnets.

According to another aspect of the disclosure, the rotor may include a three-layer topology including a first flux barrier, a second flux barrier, and a third flux barrier.

The first flux barrier may be composed of a first magnet of the first plurality of permanent magnets, a first magnet of the second plurality of permanent magnets, and a first magnet of the third plurality of permanent magnets.

The second flux barrier may be composed of a second magnet of the first plurality of permanent magnets, a second magnet of the second plurality of magnets, and a second magnet of the third plurality of magnets.

The third flux barrier may be composed of a third magnet of the first plurality of permanent magnets, a third magnet of the second plurality of permanent magnets, and a third magnet of the third plurality of permanent magnets.

According to another aspect of the disclosure, the rotor may include a first radial web and a second radial web. The first radial web may be disposed between the first plurality of permanent magnets and the second plurality of permanent magnets. The second radial web may be disposed between the second plurality of permanent magnets and the third plurality of permanent magnets.

The first plurality of permanent magnets and the third plurality of permanent magnets may include rare-earth magnets, while the second plurality of permanent magnets may include ferrite magnets, and/or other magnets that include less than about 10% by weight of rare-earth elements and/or less than about 1% by weight of heavy rare-earth elements.

According to another aspect of the disclosure, a rotary electric machine may include a stator and a rotor having an annular stack of lamination layers ("rotor lams") or flux barriers surrounded by the stator. The annular stack of rotor lams may be constructed of a magnetic core material. The annular stack of rotor lams may have an outer diameter surface and an inner diameter surface defining a plurality of openings through the magnetic core material.

Each rotor may include a set of permanent magnets disposed in the openings within the annular stack in a three-layer topology. Each of the three layers may contain at least three of the permanent magnets.

The three layers may include a first layer adjacent to the outer diameter surface, a second layer adjacent to the first layer, and a third layer adjacent to the inner diameter surface.

The set of permanent magnets may include (i) a plurality of low-coercivity permanent magnets, and (ii) a plurality of high-coercivity permanent magnets adjacent to the low-coercivity permanent magnets. The plurality of low-coercivity permanent magnets may be separated from the plurality of high-coercivity permanent magnets by one or more radial webs of the magnetic core material.

According to one aspect of the disclosure, at least one of the three layers may include at least one of the plurality of low-coercivity permanent magnets disposed on each side of one of the one or more radial webs of the magnetic core material.

The low-coercivity magnets may include, for example but not limited to ferrite magnets, and/or other magnets that include less than about 10% by weight of rare-earth elements and/or less than about 1% by weight of heavy rare-earth elements. The high-coercivity magnets may include, for example but not limited to rare-earth magnets, e.g., Nd or Sm magnets.

According to another aspect of the disclosure, an electrified vehicle may include an electric drive system including a rotary electric machine configured to be coupled to one or more road wheels disposed on a drive axle, a battery pack electrically connected to the rotary electric machine, and a controller configured to control the rotary electric machine.

The rotor may include a first plurality permanent magnets, each respective one of which is disposed within a corresponding one of the first plurality of openings. The first plurality of permanent magnets includes high-coercivity magnets, for example but not limited to rare-earth magnets, e.g., Nd magnets or samarium (Sm) magnets.

The rotor may include a second plurality of permanent magnets, each respective one of which is disposed within a corresponding one of the second plurality of openings. The second plurality of permanent magnets includes low-coercivity magnets, for example but not limited to, ferrite magnets, and/or other magnets that include less than about 10% by weight of rare-earth elements and/or less than about 1% by weight of heavy rare-earth elements.

The rotor may include a third plurality of permanent magnets, each respective one of which is disposed within a corresponding one of the third plurality of openings. The third plurality of permanent magnets includes high-coercivity magnets, for example but not limited to rare-earth magnets, e.g., Nd or Sm magnets.

According to another aspect of the disclosure, the first plurality of permanent magnets may be arranged in a first stacked configuration. Each of the first plurality of permanent magnets may have parallel magnetization.

The second plurality of permanent magnets may be arranged in a second stacked configuration. Each of the second plurality of permanent magnets may have parallel magnetization or radial magnetization.

The third plurality of permanent magnets may be arranged in a third stacked configuration. Each of the third plurality of permanent magnets may have parallel magnetization.

According to one aspect of the disclosure, the first plurality of permanent magnets and the third plurality of permanent magnets may include rare-earth magnets. The second plurality of permanent magnets may include ferrite magnets, and/or other magnets that include less than about 10% by weight of rare-earth elements and/or less than about 1% by weight of heavy rare-earth materials.

Alternatively, the electrified vehicle may include an electric drive system including a rotary electric machine configured to be coupled to one or more road wheels disposed on a drive axle, a battery pack electrically connected to the rotary electric machine, and a controller configured to control the rotary electric machine.

The rotary electric machine may include a stator and a rotor having an annular stack of lamination layers ("rotor lams") or flux barriers surrounded by the stator. The annular stack of rotor lams may be constructed of a magnetic core material. The annular stack of rotor lams may have an outer diameter surface and an inner diameter surface defining a plurality of openings through the magnetic core material.

Each rotor may include a set of permanent magnets disposed in the openings within the annular stack in a three-layer topology. Each of the three layers may contain at least three of the permanent magnets.

The three layers may include a first layer adjacent to the outer diameter surface, a second layer adjacent to the first layer, and a third layer adjacent to the inner diameter surface.

The set of permanent magnets may include (i) a plurality of low-coercivity permanent magnets, and (ii) a plurality of high-coercivity permanent magnets adjacent to the low-coercivity permanent magnets. The plurality of low-coercivity permanent magnets may be separated from the plurality of high-coercivity permanent magnets by one or more radial webs of the magnetic core material.

According to one aspect of the disclosure, at least one of the three layers may include at least one of the plurality of low-coercivity permanent magnets disposed on each side of one of the one or more radial webs of the magnetic core material.

The low-coercivity magnets may include, for example but not limited to ferrite magnets, and/or other magnets that include less than about 10% by weight of rare-earth elements and/or less than about 1% by weight of heavy rare-earth elements. The high-coercivity magnets may include, for example but not limited to rare-earth magnets, e.g., Nd or Sm magnets.

Combining high-coercivity (rare-earth) magnets, having parallel magnetization, and low-coercivity (ferrite) magnets, having both parallel magnetization and radial magnetization, in a parallel configuration, balance between sustainability and performance may be optimized. Centrally locating the ferrite magnets improves saturation of the structural members, e.g., the lamination posts, of the annular stack of rotor lams, minimizing cross demagnetization, increasing rotor robustness, and improving high-speed operation, while enabling manufacturing of curvilinear magnets.

Distributing the rare-earth magnets on each side of the ferrite magnets, toward the surface of the rotor, maximizes torque and provides robustness against demagnetization. Strategic placement of three flux barriers within the rotor enhances torque performance while ensuring smooth passage of the magnetic field.

Additionally, the ferrite permanent magnets reduce or eliminate thin magnetic bridges of the annular stack of rotor lams in web regions of the annular stack rotor lams to improve the electric machine's operating efficiency and performance, for example by reducing undesirable flux leakage/magnetic short-circuiting while providing useful mechanical support.

The above summary does not represent every embodiment or every aspect of this disclosure. The above-noted features and advantages of the present disclosure, as well as other possible features and advantages, will be readily apparent from the following detailed description of the embodiments and best modes for carrying out the disclosure when taken in connection with the accompanying drawings and appended claims. Moreover, this disclosure expressly includes combinations and sub-combinations of the elements and features presented above and below.

BRIEF DESCRIPTION OF THE DRAWINGS

FIGS. 3A, 3B and 3C are schematic illustrations of openings through a representative magnetic pole portion of a rotor shown in FIG. 2A in accordance with the present disclosure.

FIGS. 3A-1 through 3A-4 are schematic illustrations of lamination wall profiles of openings encircled at A shown in FIG. 3A in accordance with the present disclosure.

FIG. 4 is a schematic plan view illustration of a representative magnetic pole portion of a rotor shown usable as part of the electric machine of FIG. 1, with a plurality of permanent magnets bonded thereto in accordance with the present disclosure.

DETAILED DESCRIPTION

Figure 1:
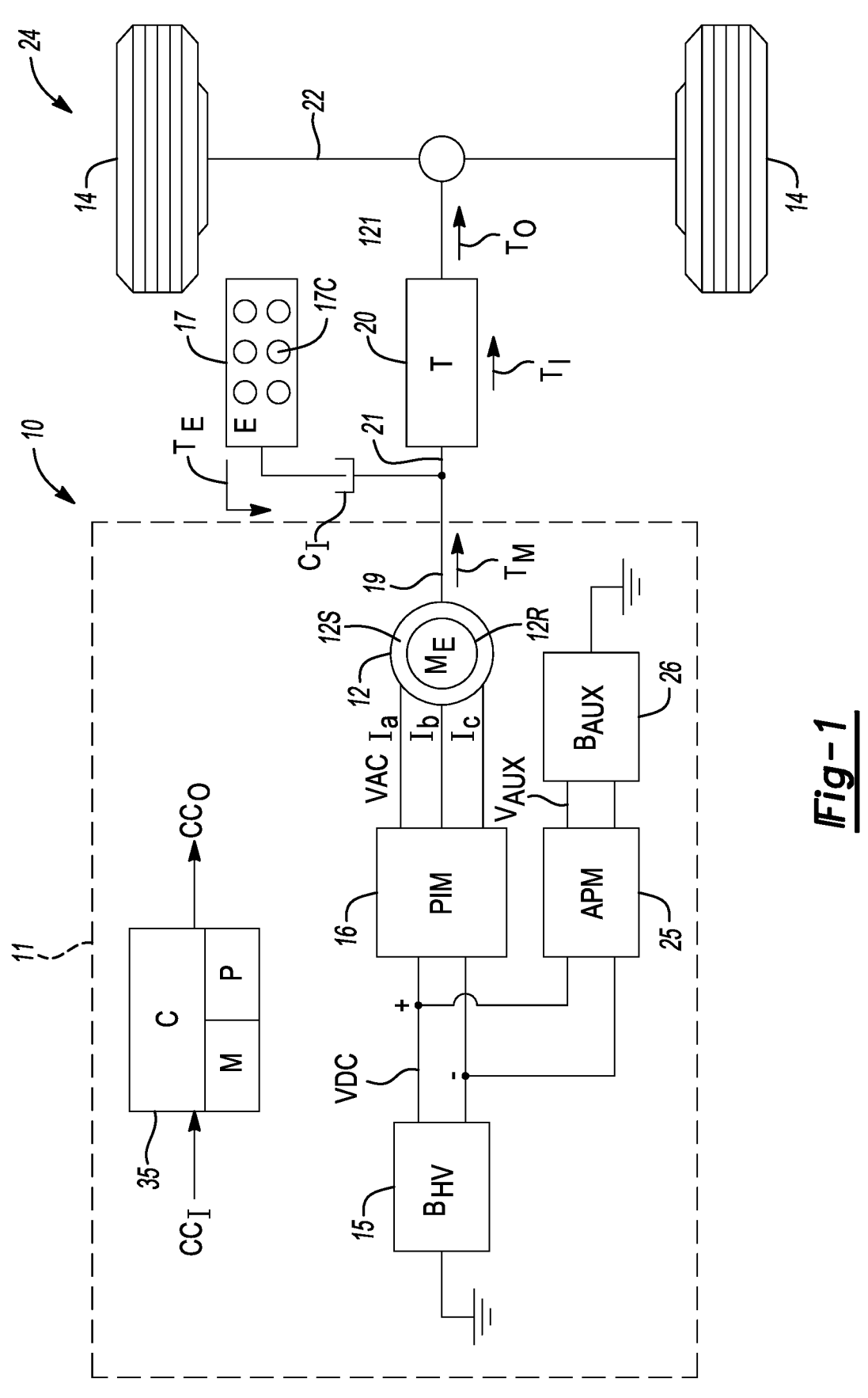
FIG. 1 is a schematic illustration of an example motor vehicle having an electric drive system inclusive of a rotary electric machine, with the rotary electric machine having a rotor including low-coercivity magnets and high-coercivity magnets in accordance with the present disclosure.

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

Referring to the drawings, wherein like reference numbers refer to like components, FIG. 1 schematically illustrates a motor vehicle 10 having an electric drive system 11, the latter of which includes a rotary electric machine (ME) 12 in the form of a motor/generator unit. As described in detail below with reference to FIGS. 2A through 4, the electric machine 12 includes a rotor 12R that is reinforced and assembled in accordance with the present disclosure. The described rotor 12R may benefit various types of wheeled and/or tracked land vehicles, propeller-driven watercraft and aircraft, mobile work platforms, etc. Non-vehicular systems may likewise benefit from the present teachings, including for instance electrified powertrain architectures, powerplants, mobile platforms, robots, hoisting or conveying equipment, and the like. The motor vehicle 10 shown in FIG. 1 is therefore illustrative of just one possible beneficial application.

The electric drive system 11 includes the rotary electric machine 12, the operation of which is regulated and controlled in real time by control signals (arrow $CC_O$) from an onboard controller (C) 50. Those skilled in the art will appreciate that motor controllers such as the schematically-represented controller 35 of FIG. 1 respond to input signals (arrow $CC_I$), e.g., driver pedal request, temperature and angular speed of the electric machine 12, etc., by generating and transmitting the control signals (arrow $CC_O$) to one or more relevant subsystems within the electric drive system 11.

Instructions for controlling the electric machine 12 may be recorded in memory (M) and executed by one or more processors (P) in real-time in response to the input signals (arrow $CC_I$). Although omitted for simplicity, the controller 35 may include one or more electronic control modules, units, processors, and associated hardware components thereof, and would be equipped with sufficient tangible and non-tangible variants of the memory (M), Application Specific Integrated Circuits (ASICs), systems-on-a-chip (SoCs), input/output circuitry, high-speed clocks or oscillators, and other hardware and software as needed to provide a desired functionality.

The electric machine 12 illustrated in FIG. 1 also includes a stator 12S. As appreciated in the art, the stator 12S may include slots that are wound or filled with conductive stator windings (not shown), such that when energized, interaction between the stator 12S and the rotor 12R causes rotation of the rotor 12R. The rotor 12R is coupled via an output member 19 to one or more road wheels 14 disposed on a drive axle 22.

In the illustrated hybrid example of the motor vehicle 10, an internal combustion engine (E) 17 having multiple combustion cylinders 17C delivers engine torque (arrow $T_E$) through an input clutch CI to an input member 21 of a transmission (T) 20, e.g., a multi-speed gearbox, with the engine 17 being omitted in other examples, such as when the motor vehicle 10 is configured as a battery electric vehicle.

In the illustrated hybrid example, motor torque (arrow $T_M$) from the electric machine 12 is delivered to the input member 21 alone or in conjunction with the engine torque (arrow $T_E$) supplied by the engine 17. In other embodiments, the electric machine 12 alone powers the transmission 20, i.e., the motor torque (arrow $T_M$) alone provides the input torque (arrow $T_I$), or the electric machine 12 may be coupled directly to one or more of the road wheels 14 to act as a wheel motor (not shown). In the illustrated exemplary example, the output torque (arrow $T_O$) is directed by an output member 121 of the transmission 20 to the road wheels 14 via the drive axle(s) 22 to propel the motor vehicle 10.

The electric machine 12 is depicted schematically in FIG. 1 with the stator 12S coaxially arranged with respect to the rotor 12R in a typical radial flux configuration, with the present teachings also being extendable to axial flux configurations. The electric machine 12 may be configured as a polyphase/alternating current (AC) traction or propulsion motor in some examples. When so constructed, the electric drive system 11 may include a high-voltage traction battery pack (BHV) 15, e.g., a multi-cell rechargeable lithium-ion construction or another suitable high-voltage/high-power battery chemistry. While the term "high-voltage" is relative to typical 12-15V auxiliary voltage levels, and thus may entail voltage levels anywhere in excess thereof, exemplary battery electrified propulsion applications of the type contemplated herein may require the battery pack 15 to have a voltage capability of 300-500V or more.

With continued reference to FIG. 1, the battery pack 15 may be electrically connected to a power inverter module (PIM) 16 via a high-voltage direct current voltage bus (VDC), with the PIM 16 in turn electrically connected to the stator 12S via a high-voltage AC voltage bus (VAC). Although omitted for illustrative simplicity, the PIM 16 is internally configured and externally controlled via ON/OFF state control of multiple dies of semiconductor switches, with such switches typically embodied as IGBTs or MOSFETs. Thus, a DC input voltage to the PIM 16 is inverted and controlled to ultimately deliver an AC output voltage and corresponding phase currents (Ia, Ib, Ic) by high-speed pulse width modulation or other suitable switching operations of the PIM 16. During a regenerating event such as braking, the PIM 16 may operate in the opposite manner, i.e., by converting an AC input voltage into a DC output voltage suitable for recharging constituent battery cells of the battery pack 15.

Other components may be connected to the electric drive system 11 shown in FIG. 1, such as but not limited to the illustrated DC-DC converter/auxiliary power module (APM) 25 and a lead-acid or other type of auxiliary battery ($B_{AUX}$) 26 operating at a lower auxiliary voltage (VAUX). As noted above, auxiliary voltage levels are typically 12-15V, and therefore the APM 25 may operate through internal switching operations and signal filtering, as is well understood in the art, to receive a relatively high DC voltage from the DC voltage bus (VDC) and output the auxiliary voltage (VAUX) to the auxiliary battery 26. The electric machine 12 is therefore just one of multiple devices requiring the reliable and sustained provision of electrical energy from the battery pack 15 during ongoing propulsion operations of the motor vehicle 10.

Figure 2A:
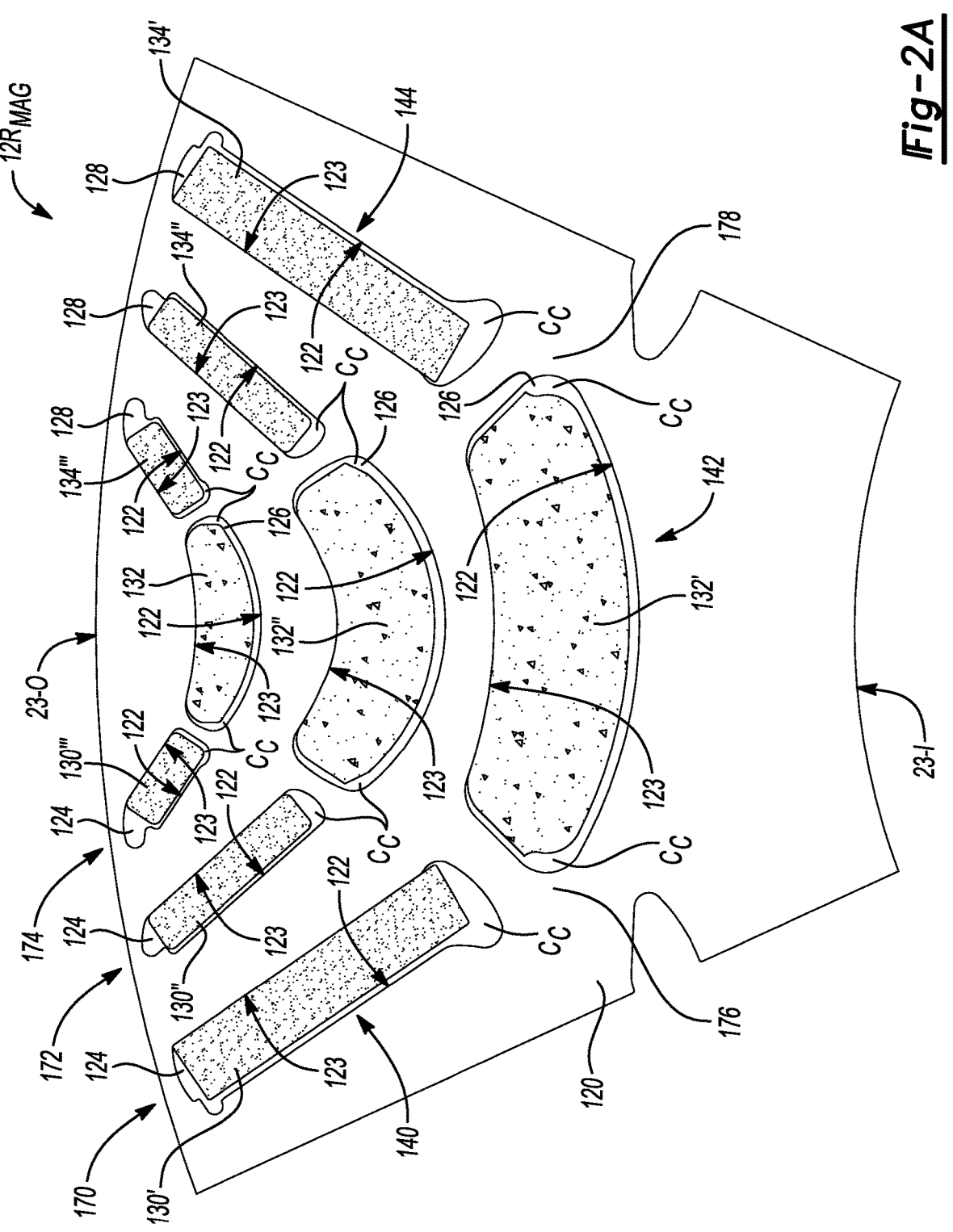
FIGS. 2A, 2B, and 2C are schematic plan view illustrations of a representative magnetic pole portion of a rotor in accordance with the present disclosure that is usable as part of the electric machine shown in FIG. 1.
Figures 2B, 2C:
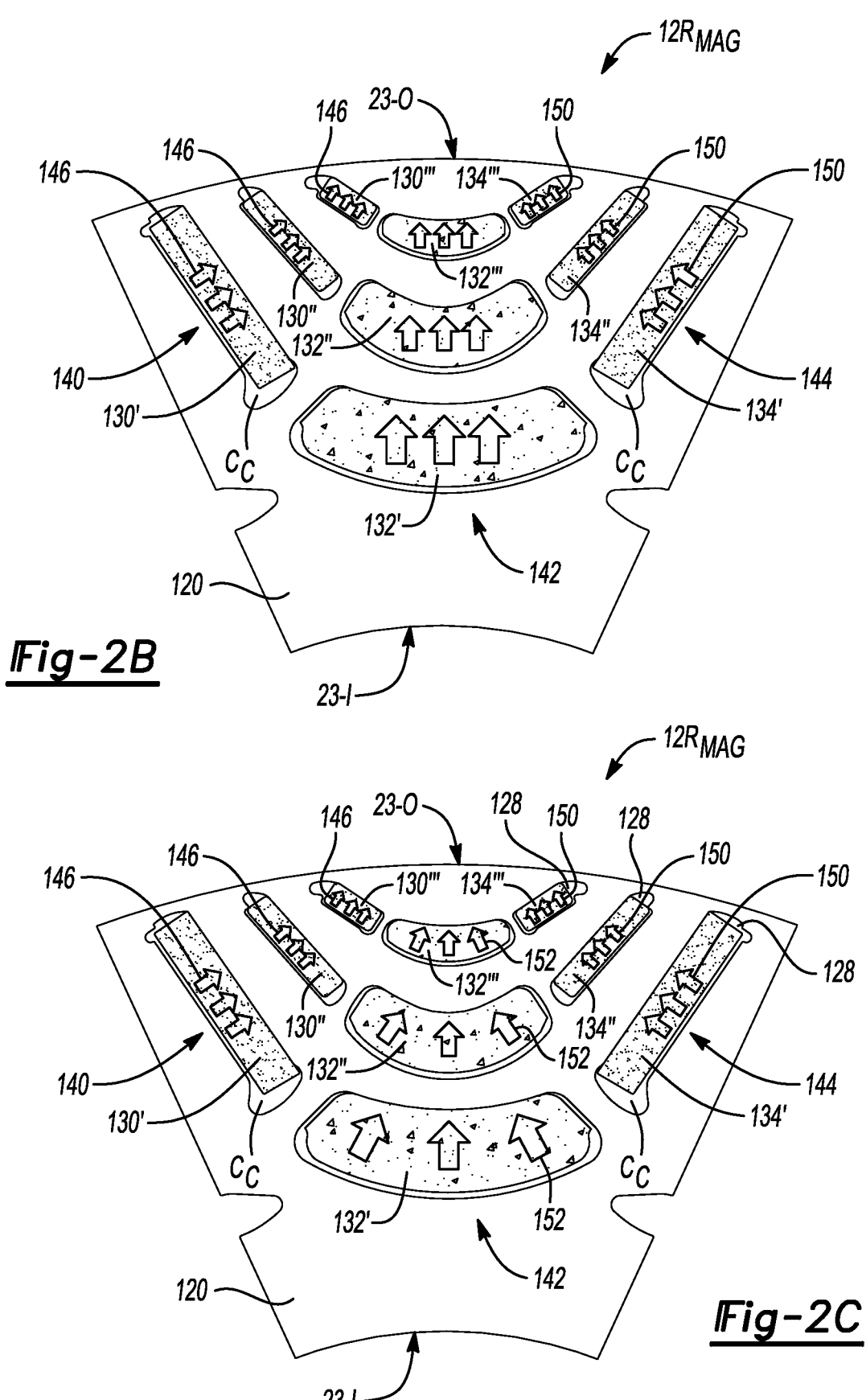

Referring now to FIGS. 2A, 2B and 2C, a schematic plan view illustration is provided of a representative magnetic pole section $12R_{MAG}$ of the rotor 12R shown in FIG. 1, with the magnetic pole section $12R_{MAG}$ including an annular stack of rotor lamination layers ("rotor lams") 120, one of which is visible from the perspective of FIGS. 2A, 2B and 2C. The rotor lams 120, which are constructed of a magnetic core material, for example but not limited to silicon steel (FeSi) and/or cobalt steel (FeCo), have inner axial surfaces 122, 123 collectively defining a first plurality of openings 124 through the magnetic core material of the rotor lams 120, a second plurality of openings 126 through the magnetic core material of the rotor lams 120, and a third plurality of openings 128 through the magnetic core material of the rotor lams 120.

A first plurality of permanent magnets 130 are disposed within the first plurality of openings 124 through the magnetic core material of the rotor lams 120, with each respective one of the first plurality of permanent magnets 130 being disposed within a corresponding one of the first plurality of openings 124 through the magnetic core material of the rotor lams 120. The first plurality of permanent magnets 130 includes high-coercivity magnets, for example but not limited to rare-earth magnets, e.g., neodymium (Nd) magnets and/or samarium (Sm) magnets. While the first plurality of magnets 130 includes rare-earth magnets, it should be appreciated that some of the magnets in the first plurality of magnets 130 may not include rare-earth magnets.

A second plurality of permanent magnets 132 are disposed within the second plurality of openings 126 through the magnetic core material of the rotor lams 120, with each respective one of the second plurality of permanent magnets 132 being disposed within a corresponding one of the second plurality of openings 126 through the magnetic core material of the rotor lams 120. The second plurality of permanent magnets includes low-coercivity magnets, for example but not limited to magnets that include less than about 10% by weight of rare-earth elements and/or less than about 1% by weight of heavy rare-earth elements, e.g., FeN, ferrite, Alinco and/or ceramic magnets. While the second plurality of magnets 132 includes magnets that include less than about 10% by weight of rare-earth elements and/or less than about 1% by weight of heavy rare-earth elements, it should be appreciated that some of the magnets in the second plurality of magnets 132 may include more than about 10% by weight of rare-earth elements and/or more than about 1% heavy rare-earth elements.

Further, while the illustrated examples show each of the second plurality of openings 125 as having a curved profile, and the second plurality of permanent magnets 132 includes curved magnets, it should be appreciated that the second plurality of openings 126 may alternatively have a flat profile, and the second plurality of permanent magnets 132 may alternatively include rectangular or flat magnets having parallel magnetization.

A third plurality of permanent magnets 134 are disposed with the third plurality of openings 128 through the magnetic core material of the rotor lams 120, with each respective one of the third plurality of permanent magnets 134 being disposed within a corresponding one of the third plurality of openings 128. The third plurality of permanent magnets 134 includes high-coercivity magnets, for example but not limited to rare-earth magnets, e.g., Nd or Sm magnets. While the third plurality of magnets 134 includes rare-earth magnets, it should be appreciated that some of the magnets in the third plurality of magnets 134 may not include rare-earth magnets.

Further, while each of the first plurality of permanent magnets 130, the second plurality of permanent magnets 132, and the third plurality of permanent magnets 134 is shown having a one-piece configuration, is should be appreciated that, based on the individual application, one or more of the first plurality of permanent magnets 130, the second plurality of permanent magnets 132, and the third plurality of permanent magnets 134 alternatively may have a segmented configuration in which each permanent magnet includes two or more magnet portions bonded together using an epoxy or phenolic adhesive, for example but not limited to, polyurethane, benzoxazine, bismaleimide, methacrylate, and the like.

The first plurality of permanent magnets 130 are arranged in a first stacked configuration 140, each of the first plurality of permanent magnets 130 having parallel magnetization, as illustrated by arrows 146 in FIGS. 2B and 2C.

The second plurality permanent magnets 132 are arranged in a second stacked configuration 142.

According to another aspect of the disclosure, the second plurality of permanent magnets 132 includes curved magnets having parallel magnetization, as illustrated by arrows 148 in FIG. 2B, or radial magnetization as illustrated by arrows 152 in FIG. 2C.

The third plurality of permanent magnets 134 are arranged in a third stacked configuration 144, each of the third plurality of permanent magnets 134 having parallel magnetization, as illustrated by arrows 150 in FIGS. 2B and 2C.

Figures 1, 3A:
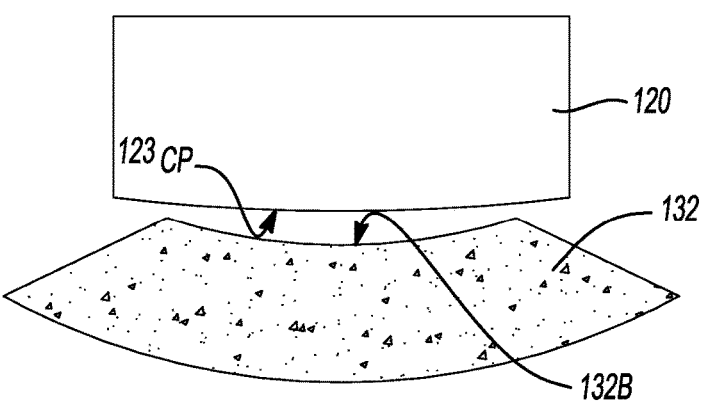

Referring now to FIGS. 3A, 3B and 3C, schematic section plan view illustrations are provided of a representative one of the first plurality of openings 124 through the magnetic core material of the rotor lams 120 shown in FIG. 1 (FIG. 3B), a representative one of the second plurality of openings 126 through the magnetic core material of the rotor lams 120 shown in FIG. 1 (FIG. 3A), and a representative one of the third plurality of openings 128 through the magnetic core material of the rotor lams 120 shown in FIG. 1 (FIG. 3C).

As further illustrated in FIG. 3A, each curved magnet 132 includes a first curved surface 132A and a second curved surface 132B. The inner axial surfaces 122, 123 of each of the second plurality of openings 126 have curved profiles $122_{CP}$, $123_{CP}$ (FIG. 3A-1) that correspond respectively to the first curved surface 132A and the second curved surface 132B of each curved magnet 132 disposed within the second plurality of openings 126 through the magnetic core material of the annular rotor lams 120.

Figures 2, 3A:
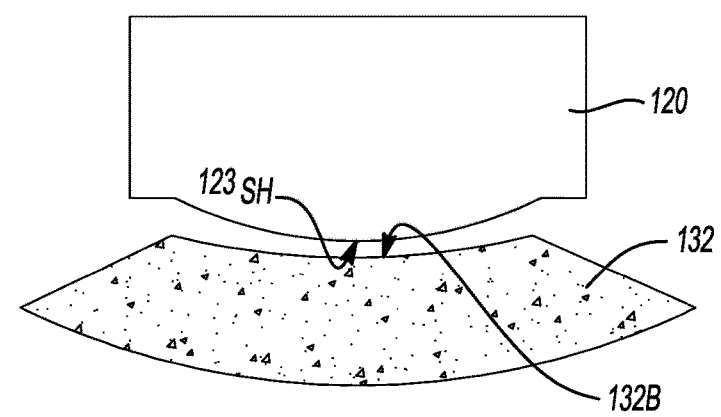
Figures 3, 3A:
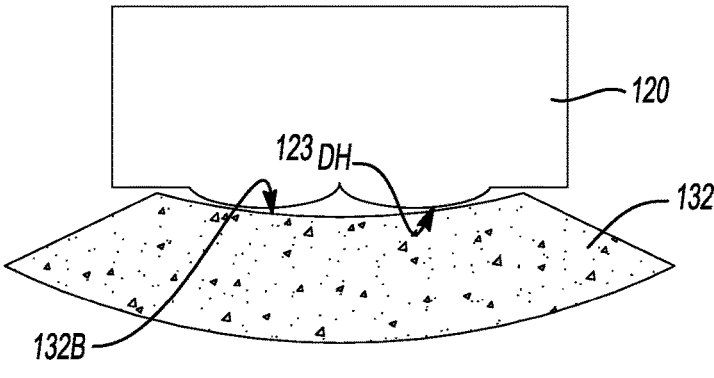

According to another aspect of the disclosure, the inner axial surface 123 of at least one of the second plurality of openings 126 includes a single hump profile $123_{SH}$, as illustrated in FIG. 3A-2 or a double hump profile $123_{DH}$, as illustrated in FIG. 3A-3. While the illustrated examples show the inner axial surface 123 of at least one of the second plurality of openings 126 as having a single or double hump profile, it should be appreciated that, based on the individual application, the profile of the inner axial surface 123 may include more than two humps.

According to another aspect of the disclosure, as illustrated in FIG. 3A-4, at least one of the second plurality of openings 126 includes a polymer support layer 160 between the curved magnet 132 corresponding to the at least one of the second plurality of openings 126 and the at least one of the second plurality of openings 126.

The polymer support layer 160 may include but is not limited to an epoxy, a phenolic adhesive, a polyurethane, a benzoxazine, a bismaleimide, a methacrylate, or the like. The polymer support layer 160 may also include mineral or fiber fillers to increase stiffness, strength and/or reduce thermal expansion.

According to another aspect of the disclosure, as illustrated in FIG. 4, each of the second plurality of permanent magnets 132 are bonded to the annular stack of rotor lams 120 via a bonding agent 162, for example but not limited to an epoxy, a phenolic adhesive, a polyurethane, a benzoxazine, a bismaleimide, a methacrylate, or the like. According to one aspect of the disclosure, the bonding agent 162 may include mineral and/or fiber fillers to increase stiffness and/or strength, and/or reduce the coefficient of thermal expansion.

Prior to bonding each of the plurality of second magnets 132 to the annular stack of rotor lams 120 via the bonding agent 162, a primer, for example but not limited to an epoxy, a phenolic, and/or a polyurethane, or surface treatment, for example but not limited to a plasma treatment, a silane treatment, and/or a chemical conversion coating, may be applied to surfaces of each of the plurality of second magnets 132.

As illustrated in FIGS. 3B and 3C with continued reference to FIG. 2, each of the first plurality of permanent magnets 130 disposed within the first plurality of openings 124 through the magnetic core material of the rotor lams 120 and each of the third plurality of permanent magnets 134 disposed within the third plurality of openings 128 through the magnetic core material of the rotor lams 120, have a rectangular configuration.

According to one aspect of the disclosure, the first plurality of permanent magnets 130 and the third plurality of permanent magnets 134 include rare-earth magnets, and the second plurality of permanent magnets 132 include ferrite magnets.

A height $H_F$ of at least one of the second plurality of permanent magnets 132 is greater than a height $H_R$ of at least one of the first plurality of permanent magnets 130 and/or at least one of the second plurality of permanent magnets 132.

As illustrated in FIGS. 2A through 3C, and 4, at least some of the first plurality of openings 124, the plurality of second openings 126, and the plurality of third openings 128 define one or more cooling channels Cc therethrough in proximity to at least some of the first plurality of permanent magnets 130, the second plurality of permanent magnets 132, and the third plurality of permanent magnets 134.

Referring back to FIG. 2, the rotor lams 120 include a three-layer topology having a first flux barrier 170, a second flux barrier 172, a third flux barrier 174, a first radial web 176, and a second radial web 178.

The first flux barrier 172 is composed of a first magnet 130' of the first plurality of permanent magnets, a first magnet 132' of the second plurality of permanent magnets 132, and a first magnet 134' of the third plurality of permanent magnets 134. The second flux barrier 172 is composed of a second magnet 130" of the first plurality of permanent magnets 130, a second magnet 132" of the second plurality of magnets 132, and a second magnet 134" of the third plurality of magnets 134. The third flux barrier 174 is composed of a third magnet 130'" of the first plurality of permanent magnets 130, a third magnet 132'" of the second plurality of permanent magnets 132, and a third magnet 134'" of the third plurality of permanent magnets 134.

The first radial web 176 is disposed between the first plurality of permanent magnets 130 and the second plurality of permanent magnets 132. The second radial web 178 is disposed between the second plurality of permanent magnets 132 and the third plurality of permanent magnets 134.

The first plurality of permanent magnets 130 and the third plurality of permanent magnets 134 include rare-earth magnets, e.g., Nd magnets, the second plurality of permanent magnets 132 include magnets that include less than about 10% by weight of rare-earth elements and/or less than about 1% by weight of heavy rare-earth elements, e.g., ferrite magnets.

Referring back to FIG. 1, a rotary electric machine includes a stator 12S and a rotor 12R having a plurality of lamination layers ("rotor lams") 120 surrounded by the stator 12S is disclosed. Each of the plurality of rotor lams 120, which are constructed of a magnetic core material, includes inner axial surfaces 122, 123 that collectively define a first plurality of openings 124 through the magnetic core material of the rotor lams 120, a second plurality of openings 126 through the magnetic core material of the rotor lams 120, and a third plurality of openings 128 through the magnetic core material of the rotor lams 120.

A first plurality permanent magnets 130, each respective one of which is disposed within a corresponding one of the first plurality of openings 124, wherein the first plurality of permanent magnets 130 includes high-coercivity magnets.

A second plurality of permanent magnets 132, each respective one of which is disposed within a corresponding one of the second plurality of openings 126, wherein the second plurality of permanent magnets 132 includes low-coercivity magnets.

A third plurality of permanent magnets 134, each respective one of which is disposed within a corresponding one of the third plurality of openings 128, wherein the third plurality of permanent magnets 134 includes high-coercivity magnets.

The first plurality of permanent magnets 130 are arranged in a first stacked configuration 140 with each of the first plurality of permanent magnets 130 having parallel magnetization.

The second plurality of permanent magnets 132 are arranged in a second stacked configuration 142 with each of the second plurality of permanent magnets 132 having parallel magnetization and radial magnetization.

The third plurality of permanent magnets 134 are arranged in a third stacked configuration 144 with each of the third plurality of permanent magnets 134 having parallel magnetization.

The first plurality of permanent magnets 130 and the third plurality of permanent magnets 134 include rare-earth magnets, e.g., Nd magnet, while the second plurality of permanent magnets 132 include magnets that include less than about 10% by weight of rare-earth elements and/or less than about 1% by weight of heavy rare-earth elements, e.g., ferrite magnets.

Referring back to FIG. 1, a motor vehicle 10 including an electric drive system 11 ("electrified vehicle") having a rotary electric machine ($M_E$) 12 with the rotary electric machine 12 having a rotor 12R including low-coercivity magnets and high-coercivity magnets is also disclosed. The electrified vehicle 10, 11 having a rotary electric machine 12 is configured to be coupled to one or more road wheels 14 disposed on a drive axle 22. A battery pack 15 is electrically connected to the rotary electric machine 12, and a controller 35 is configured to control the rotary electric machine 12.

The rotary electric machine 12 includes a stator 12S and a rotor 12R having a plurality of lamination layers ("rotor lams") 120 surrounded by the stator 12S. The plurality of rotor lams 120, which are constructed of a magnetic core material, include inner axial surfaces 122, 123 collectively defining a first plurality of openings through the magnetic core material of the rotor lams 120, a second plurality of openings through the magnetic core material of the rotor lams 120, and a third plurality of openings through the magnetic core of the rotor lams 120.

A first plurality permanent magnets 130, each respective one of which is disposed within a corresponding one of the first plurality of openings 124. The first plurality of permanent magnets 130 includes high-coercivity magnets.

A second plurality of permanent magnets 132 each respective one of which is disposed within a corresponding one of the second plurality of openings 126. The second plurality of permanent magnets 132 includes low-coercivity magnets.

A third plurality of permanent magnets 134, each respective one of which is disposed within a corresponding one of the third plurality of openings 128. The third plurality of permanent magnets 134 includes high-coercivity magnets.

The first plurality of permanent magnets 130 and the third plurality of permanent magnets 134 include rare-earth magnets, e.g., Nd magnets, while the second plurality of permanent magnets 132 include magnets that include less than about 10% by weight of rare-earth elements and/or about 1% by weight of heavy rare-earth elements, e.g., ferrite magnets.

Figure 5:
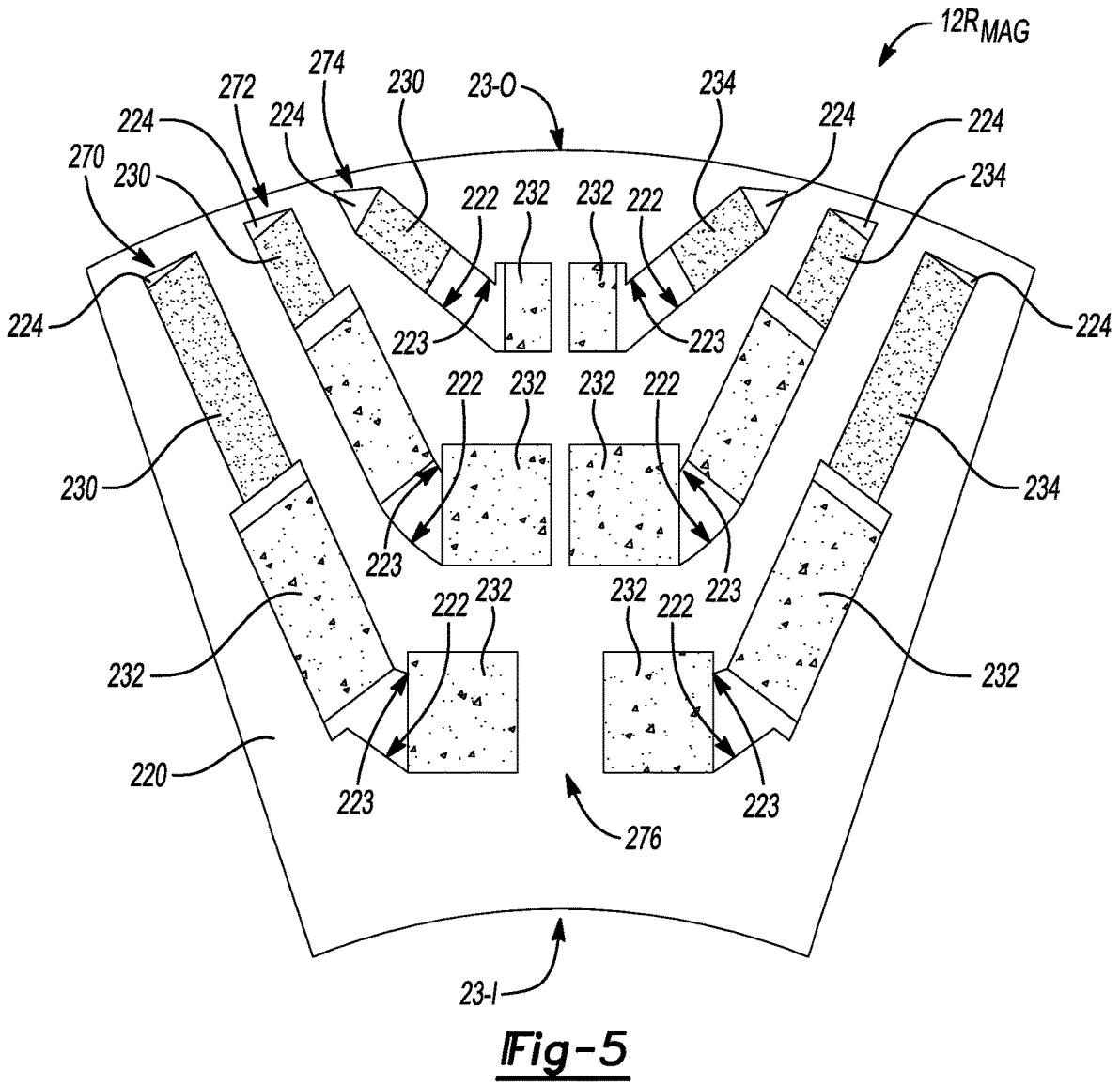
FIG. 5 is a schematic plan illustration of another representative magnetic pole portion of a rotor in accordance with the present disclosure that is a usable part of the machine shown in FIG. 1.

Referring now to FIG. 5, a schematic plan view illustration is provided of another representative magnetic pole section 12R$_{MAG}$ of the rotor 12R shown in FIG. 1, with the magnetic pole section 12R$_{MAG}$ including an annular stack of rotor lamination layers ("rotor lams") 220, one of which is visible from the perspective of FIG. 5. The rotor lams 220, which are constructed of a magnetic core material, for example but not limited to silicon steel (FeSi) and/or cobalt steel (FeCo), have inner axial surfaces 222, 223 collectively defining a plurality of openings 224 through the magnetic core material of the rotor lams 220.

The rotor lams 220 have an outer diameter surface 23-O and an inner diameter surface 23-I that define the plurality of openings 224 through the magnetic core material of the rotor lams 220.

Each rotor lam 220 includes a set of permanent magnets 230, 232, 234 disposed in the openings 224 within the annular stack of rotor lams 220 in a three-layer topology. Each of the three layers 270, 272, 274 contains at least three of the permanent magnets 230, 232, 234.

The three layers may include a first layer 274 adjacent to the outer diameter surface 23-O, a second layer adjacent 272 to the first layer 274, and a third layer 270 adjacent to the inner diameter surface 23-I.

The set of permanent magnets 230, 232, 234 include (i) a plurality of low-coercivity permanent magnets 232, and (ii) a plurality of high-coercivity permanent magnets 230, 234 adjacent to the low-coercivity permanent magnets 232. The plurality of low-coercivity permanent magnets 232 are separated from the plurality of high-coercivity permanent magnets 230, 234 by one or more radial webs 276 of the magnetic core material of the rotor lams 220.

According to one aspect of the disclosure, at least one of the three layers 270, 272, 274 includes at least one of the plurality of low-coercivity permanent magnets 232 disposed on each side of one of the one or more radial webs 276 of the magnetic core material of the rotor lams 220.

The low-coercivity magnets 232 may include, for example but not limited to ferrite magnets, and/or other magnets that include less than about 10% by weight of rare-earth elements and/or less than about 1% by weight of heavy rare-earth elements. The high-coercivity magnets 230, 234 may include, for example but not limited to rare-earth magnets, e.g., Nd or Sm magnets.

As appreciated in the art, such magnetic pole sections $12R_{MAG}$ repeat around the full circumference of the annular rotor lams 120 with a number of such magnetic pole sections $12R_{MAG}$ in a given construction of the rotor 12R thus being equal to the number of magnetic poles of the rotor 12R. The exemplary magnetic pole section $12R_{MAG}$ is depicted with a non-limiting representative size and internal configuration, in this instance as one of six magnetic pole sections $12R_{MAG}$ in a 6-pole construction of the rotor 12R of FIG. 1 defining nine rotor openings 124, 126, 128 per magnetic pole section $12R_{MAG}$. In other words, the rotor 12R may have fewer or more magnetic pole sections $12R_{MAG}$ in various embodiments, with or without the depicted number, shape, and orientation of the rotor openings 124, 126, 128.

Each fully-formed rotor lam 120 defines a closed annulus or ring having an outer diameter surface 23-O and an inner diameter surface 23-I, as appreciated in the art, and therefore a given magnetic pole section $12R_{MAG}$ extends radially between the respective outer and inner diameter surfaces 23-O and 23-I. When fully assembled, the rotor 12R and its constituent axially-extending annular stack of rotor lams 120 forms a cylindrical hub. A rotor shaft (not shown) may be splined or otherwise joined to the inner diameter surfaces 23-I of the annular stack rotor lams 120 and coupled to a load 24, e.g., the output member 19, transmission 20, and/or axles 22 as shown in FIG. 1.

The foregoing disclosure thus enables a rotor 12R shown in the non-limiting application of FIG. 1 from an annular stack of the rotor lams 120 with high-coercivity permanent magnets and low-coercivity permanent magnets configured as described herein.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A rotor for a rotary electric machine, the rotor comprising:

an annular stack of rotor lamination layers constructed of a magnetic core material, the rotor lamination layers having inner axial surfaces collectively defining a first plurality of openings through the magnetic core material, a second plurality of openings through the magnetic core material, and a third plurality of openings through the magnetic core material;

a first plurality of permanent magnets, each respective one of which is disposed within a corresponding one of the first plurality of openings, wherein the first plurality of permanent magnets includes high-coercivity magnets;

a second plurality of permanent magnets, each respective one of which is disposed within a corresponding one of the second plurality of openings, wherein the second plurality of permanent magnets includes curved magnets having low-coercivity; a third plurality of permanent magnets, each respective one of which is disposed within a corresponding one of the third plurality of openings, wherein the third plurality of permanent magnets includes additional high-coercivity magnets; and a first radial web and a second radial web, wherein the first radial web is disposed between the first plurality of permanent magnets and the second plurality of permanent magnets, and wherein the second radial web is disposed between the second plurality of permanent magnets and the third plurality of permanent magnets.

2. The rotor as recited in claim 1, wherein the first plurality of permanent magnets is arranged in a first stacked configuration, each of the first plurality of permanent magnets having parallel magnetization.

3. The rotor as recited in claim 2, wherein the third plurality of permanent magnets are arranged in a third stacked configuration, each of the third plurality of permanent magnets having parallel magnetization.

4. The rotor as recited in claim 3, wherein each of the first plurality of permanent magnets and each of the third plurality of permanent magnets have a rectangular configuration.

5. The rotor as recited in claim 4, wherein the first plurality of permanent magnets and the third plurality of permanent magnets include rare-earth magnets, and wherein the second plurality of permanent magnets include ferrite magnets.

6. The rotor as recited in claim 5, wherein a height of at least one of the ferrite magnets is greater than a height of at least one of the rare-earth magnets.

7. The rotor as recited in claim 1, wherein the second plurality permanent magnets are arranged in a second stacked configuration, each of the second plurality of permanent magnets having parallel magnetization.

8. The rotor as recited in claim 1, wherein the second plurality of permanent magnets are arranged in a second stacked configuration having radial magnetization.

9. The rotor as recited in claim 8, wherein at least one of the second plurality of openings includes a double hump profile.

10. The rotor as recited in claim 1, wherein at least one of the second plurality of openings includes a polymer support layer between the permanent magnet corresponding to the at least one of the second plurality of openings and the at least one of the second plurality of openings.

11. The rotor as recited in claim 1, wherein each of the second plurality of permanent magnets are bonded to the annular stack of rotor lamination layers.

12. The rotor as recited in claim 1, wherein at least some of the first plurality of openings, the plurality of second openings, and the plurality of third openings define one or more cooling channels therethrough in proximity to at least some of the first plurality of permanent magnets, the second plurality of permanent magnets, and the third plurality of permanent magnets.

13. The rotor as recited in claim 1, further comprising a three-layer topology including:

a first flux barrier composed of a first magnet of the first plurality of permanent magnets, a first magnet of the second plurality of permanent magnets, and a first magnet of the third plurality of permanent magnets;

a second flux barrier composed of a second magnet of the first plurality of permanent magnets, a second magnet of the second plurality of magnets, and a second magnet of the third plurality of magnets; and a third flux barrier composed of a third magnet of the first plurality of permanent magnets, a third magnet of the second plurality of permanent magnets, and a third magnet of the third plurality of permanent magnets.

14. The rotor as recited in claim 13, wherein the first plurality of permanent magnets and the third plurality of permanent magnets include rare-earth magnets, and wherein the second plurality of permanent magnets include ferrite magnets.

15. A rotary electric machine comprising:

a stator;

a rotor having an annular stack of lamination layers surrounded by the stator, the annular stack constructed of a magnetic core material, the rotor lamination layers having an outer diameter and an inner diameter surface defining a plurality of openings therethrough; and a set of permanent magnets disposed in the openings and arranged within the annular stack in a three-layer topology, each respective one of the three layers containing at least three of the permanent magnets, the three layers including:

a first layer adjacent to the outer diameter surface;

a second layer adjacent to the first layer; and a third layer adjacent to the inner diameter surface, the set of permanent magnets including (i) a plurality of low-coercivity permanent magnets, and (ii) a plurality of high-coercivity permanent magnets adjacent to the plurality of low-coercivity permanent magnets and separated therefrom by one or more radial webs of the magnetic core material, wherein the plurality of low-coercivity permanent magnets includes curved magnets.

16. The rotary electric machine as recited in claim 15, wherein at least one of the three layers includes at least one of the plurality of low-coercivity magnets disposed on each side of one of the one or more radial webs of the magnetic core material.

17. The rotary electric machine as recited in claim 15, wherein the low-coercivity permanent magnets include ferrite magnets, and the high-coercivity permanent magnets includes rare-earth permanent magnets, and wherein the second plurality of permanent magnets include ferrite magnets.

18. An electrified vehicle comprising:

an electric drive system including:

a rotary electric machine configured to be coupled to one or more road wheels disposed on a drive axle;

a battery pack electrically connected to the rotary electric machine; and a controller configured to control the rotary electric machine, wherein the rotary electric machine includes:

a stator; and a rotor having a plurality of lamination layers surrounded by the stator, the plurality of rotor lamination layers constructed of a magnetic core material, the rotor lamination layers having inner axial surfaces collectively defining a first plurality of openings through the magnetic core material, a second plurality of openings through the magnetic core material, and a third plurality of openings through the magnetic core;

a first plurality of permanent magnets, each respective one of which is disposed within a corresponding one of the first plurality of openings, wherein the first plurality of permanent magnets includes high-coercivity magnets;

a second plurality of permanent magnets, each respective one of which is disposed within a corresponding one of the second plurality of openings, wherein the second plurality of permanent magnets includes curved magnets having low-coercivity; a third plurality of permanent magnets, each respective one of which is disposed within a corresponding one of the third plurality of openings, wherein the third plurality of permanent magnets includes high-coercivity magnets; and a first radial web and a second radial web, wherein the first radial web is disposed between the first plurality of permanent magnets and the second plurality of permanent magnets, and wherein the second radial web is disposed between the second plurality of permanent magnets and the third plurality of permanent magnets.

19. The electrified vehicle as recited in claim 18, wherein the first plurality of permanent magnets and the third plurality of permanent magnets include rare-earth magnets, and wherein the second plurality of permanent magnets include ferrite magnets.

20. The electrified vehicle as recited in claim 19, wherein at least one of the second plurality of openings includes a polymer support layer between the permanent magnet corresponding to the at least one of the second plurality of openings and the at least one of the second plurality of openings.

* * * * *